US012046817B2

(12) United States Patent
Patriotis et al.

(10) Patent No.: US 12,046,817 B2
(45) Date of Patent: Jul. 23, 2024

(54) ACHIEVEMENT OF CLOSE TO PURE WIDEBAND CIRCULAR POLARIZATION IN PRINTED ANTENNA ARRAYS

(71) Applicants: UNM Rainforest Innovations, Albuquerque, NM (US); BlueCom Systems and Consulting, LLC, Albuquerque, NM (US)

(72) Inventors: Marios Patriotis, Albuquerque, NM (US); Christos G. Christodoulou, Albuquerque, NM (US); Sudharman Jayaweera, Albuquerque, NM (US); Firas Nazem Ayoub, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 361 days.

(21) Appl. No.: 17/416,462

(22) PCT Filed: Dec. 13, 2019

(86) PCT No.: PCT/US2019/066391
§ 371 (c)(1),
(2) Date: Jun. 18, 2021

(87) PCT Pub. No.: WO2020/131643
PCT Pub. Date: Jun. 25, 2020

(65) Prior Publication Data

US 2022/0069475 A1 Mar. 3, 2022

Related U.S. Application Data

(60) Provisional application No. 62/781,530, filed on Dec. 18, 2018.

(51) Int. Cl.
*H01Q 21/00* (2006.01)
*H01Q 21/06* (2006.01)

(52) U.S. Cl.
CPC ....... *H01Q 21/0006* (2013.01); *H01Q 21/065* (2013.01)

(58) Field of Classification Search
CPC .......................... H01Q 21/065; H01Q 21/0006
See application file for complete search history.

(56) References Cited

U.S. PATENT DOCUMENTS

| | | | | |
|---|---|---|---|---|
| 4,728,960 | A * | 3/1988 | Lo | G01S 7/038 343/700 MS |
| 5,382,959 | A | 1/1995 | Pett | |
| 8,063,832 | B1 * | 11/2011 | Weller | H01Q 21/08 343/824 |
| 9,391,375 | B1 * | 7/2016 | Bales | H01Q 21/064 |

(Continued)

FOREIGN PATENT DOCUMENTS

| | | | |
|---|---|---|---|
| CN | 105552555 | A | 5/2016 |
| RU | 2080712 | C1 | 5/1997 |
| RU | 2156525 | C2 | 9/2000 |

OTHER PUBLICATIONS

Patriotis et al; A K/Ka Band Frequency Reconfigurable Transmit/Receive Antenna Array; 13th European Conference on Antennas and Propagation (EuCAP 2019); Mar. 31 to Apr. 5, 2019; 4 pages; EP.

(Continued)

*Primary Examiner* — Lam T Mai
(74) *Attorney, Agent, or Firm* — Keith Vogt, Ltd.; Keith A. Vogt

(57) ABSTRACT

A circularly polarized antenna having a plurality of arrays. The arrays comprised of a plurality of antenna elements which are consecutively orthogonal to each other.

20 Claims, 7 Drawing Sheets

(56) References Cited

U.S. PATENT DOCUMENTS

| | | | | |
|---|---|---|---|---|
| 9,806,777 | B1 * | 10/2017 | Doostnejad | H04B 7/0617 |
| 11,506,773 | B1 * | 11/2022 | Everett | G01S 7/03 |
| 11,550,017 | B2 * | 1/2023 | Athley | G01S 3/325 |
| 2010/0225552 | A1 * | 9/2010 | Shimizu | H01Q 21/28 343/893 |
| 2013/0234891 | A1 * | 9/2013 | Natarajan | G01V 8/20 342/368 |
| 2016/0344089 | A1 | 11/2016 | Baik et al. | |
| 2021/0389453 | A1 * | 12/2021 | Panzer | H01Q 21/061 |
| 2022/0336967 | A1 * | 10/2022 | Park | H01Q 9/20 |
| 2023/0198167 | A1 * | 6/2023 | Kim | H01Q 1/246 343/893 |

OTHER PUBLICATIONS

Patriotis et al; A Ka-Band Frequency Reconfigurable Circularly Polarized Antenna Array Using a Ring Resonator; 2018 IEEE International Symposium on Antennas and Propatation & USNC/URSI National Radio Science Meeting; Conference meeting Jul. 8-13, 2018; 2 pages; pp. 467-468.

Patriotis et al; A Reconfigurable K/Ka Band Filtenna Using a Double Arm Ring Resonator, 2019 APS; presented Jul. 11, 2019; https://www.2019apsursi.org/Papers/ViewPapers.asp?PaperNum=2398; IEEE.

Federal Institute of Industrial Property; International Search Report & Written Opinion for PCT/US2019/066391; 8 pages; Mar. 12, 2020; Moscow, RU.

Sheng et al; A Compact Dual-Band Orthogonal Circularly Polarized Antenna Array with Disparate Elements; IEEE Transactions on Antennas & Propatation; Apr. 2015 Part 1, vol. 63, issue 4, pp. 1359-1364; 7 pages.

Rahman et al; Design of an Orthogonal Feed Circularly Polarized Microstrip Array Antenna Suitable for Large Scale Extensible Arrays; 2016 5th International Conference on Informatics, Electronics and Vision (ICIEV); May 13-14, 2016; p. 30-34.

* cited by examiner

ACHIEVEMENT OF CLOSE TO PURE WIDEBAND CIRCULAR POLARIZATION IN PRINTED ANTENNA ARRAYS

RELATED APPLICATIONS

This application claims priority to U.S. Provisional application Ser. No. 62/781,530 filed on 18 Dec. 2018, which is incorporated herein in its entirety.

STATEMENT REGARDING FEDERALLY SPONSORED RESEARCH & DEVELOPMENT

This invention was made with government support by the National Aeronautics and Space Administration grant number NNX17CC01C. The government has certain rights in the invention.

BACKGROUND OF THE INVENTION

In recent years, the increasing data volume shared over terrestrial to satellite communication links triggered the demand for higher capacity channels. This resulted in the need for wider bandwidth communication systems.

In addition, the use of CubeSats for cheaper and wider communication coverage opened the possibilities for cluster satellite communication. Thus, since CubeSats are small, they require miniaturized and light antennas.

In space applications and specifically on CubeSat satellites, a K/Ka-band printed antenna is desired. The antenna should be easily assembled and placed. Moreover, the antenna needs to operate with high purity circular polarization in order to avoid wave depolarization while propagating through the atmospheric media. Furthermore, good communication links with the earth terminal stations can be established and secured with high gain antennas.

Planar antenna arrays with broadside a radiation pattern is preferred as a low-profile structure. Such a structure can support any kind of polarization. This is determined by the radiating element shape, the arrangement of the elements and the feeding method used. It also allows for high gain by proper element positioning.

In other efforts, circular polarization is created by implementing truncated rectangular patches with a narrow circular polarization tendency band. This design has the elements orthogonally oriented between each other and fed by a combination of a sequential rotation and a parallel feeding network to form an n-element antenna array.

A different technique that has been implemented previously is the use of wideband linearly polarized elements placed in cross configuration and fed by double sequential feeding network to excite circular polarization.

Another effort for circular polarization is the feeding of a 4×4 circular patch array through modified aperture slot arms. The stacked antenna has a parallel feeding network at its bottom that feeds the radiating elements in phase through coupling.

SUMMARY OF THE INVENTION

In one embodiment, the present invention concerns the design of miniaturized compact antennas.

In another embodiment, the present invention provides antennas that support the lowest axial ratio currently possible, have a highly directional pattern with the lowest side lobe level and have an extremely large operating range limited only by the desired performance.

In another embodiment, the present invention provides a wideband right hand circularly polarized antenna array having sequential rotation power dividers; a stack assembly topology; and continual orthogonal placement of the elements.

In another embodiment, present invention provides a wideband right hand circularly polarized antenna array based on the implementation of sequential rotation power dividers. The antenna characteristics and footprint are improved by using a stack assembly topology and a continual orthogonal placement of the elements.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Thorough the below description of the various embodiments of the present invention, one or more models or examples will be provided. However, the methodology remains the same to secure the aforementioned traits of various antennas.

Figure 1A:
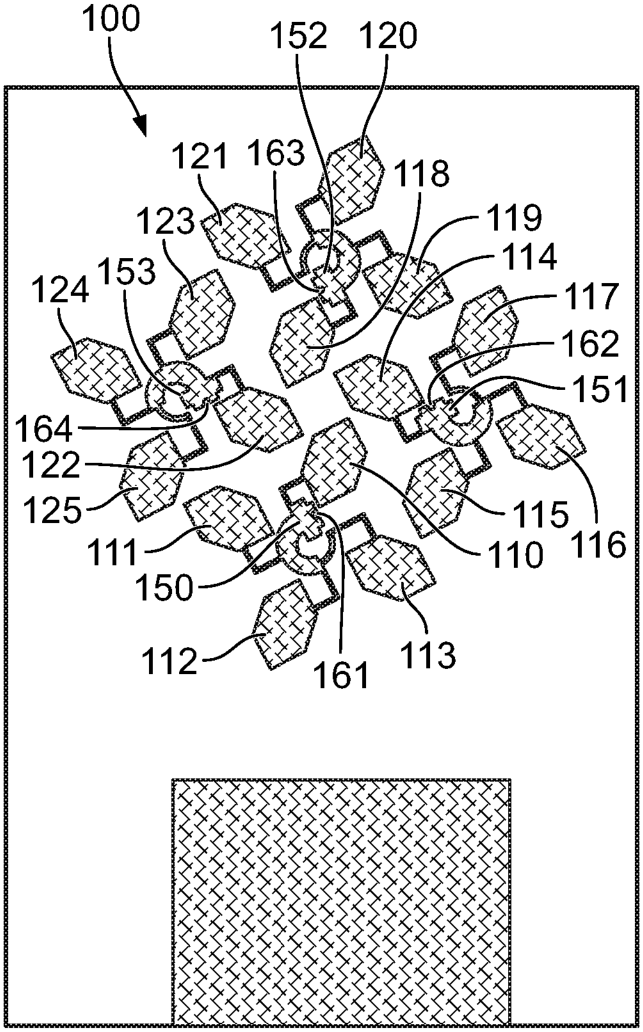
FIG. 1A illustrates a top view of an embodiment of the present invention.
Figure 2:
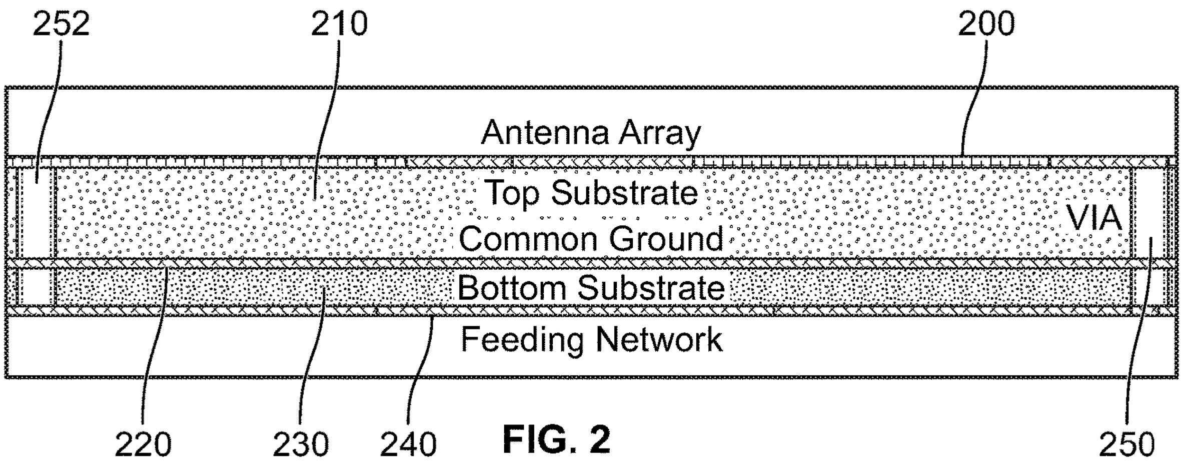
FIG. 2 illustrates antenna layers that may be used with an embodiment of the present invention.

In one embodiment, the present invention provides a K/Ka-band wideband right hand circularly polarized 16-element stack antenna array 100 fed by sequential rotation series power dividers as shown in FIG. 1A. In a preferred embodiment, as shown in FIG. 2, antenna 100 may be planar and include a plurality of layers. In the embodiment shown, the layers may include antenna array 200, top substrate 210, common ground 220, bottom substrate 230 and feeding network 240. VIAs such as 250 and 252 connect the transmission lines of layer 240 to the radiating elements of layer 200.

As shown in FIG. 1A, antenna 100 may be comprised of a plurality of element antenna arrays. A preferred embodiment includes 16-antenna elements 110-125 arranged in groups of 4-element antenna arrays. A first antenna array group is comprised of antenna elements 110-113. A second antenna array group is comprised of antenna elements 114-117. A third antenna array group is comprised of antenna elements 118-121. A fourth antenna array group is comprised of antenna elements 122-125.

Figure 1B:
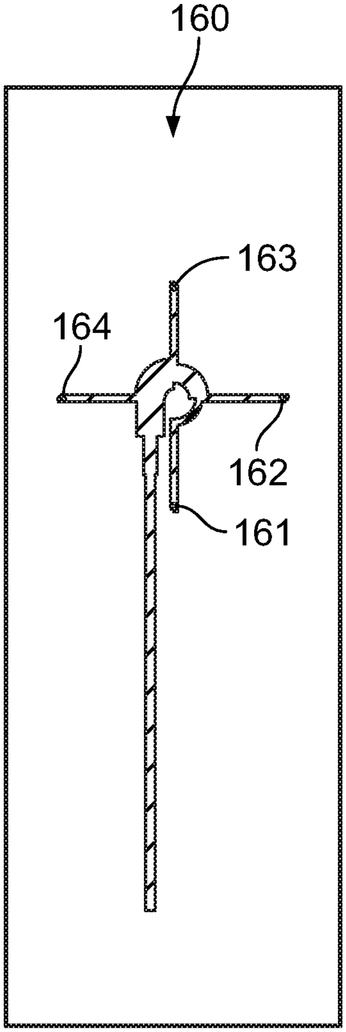
FIG. 1B illustrates a bottom view of the embodiment shown in FIG. 1A.

As also shown in FIG. 1A, each group consists of a sequential rotation series power divider 150-153 that feed elements 110-125. As shown in FIG. 1B, the main feeding network 160 at the bottom layer, feeds the top power dividers 150-153 though VIAs 161-164. Each array may be implemented on a 0.5 mm thick RO3003 substrate with relative permittivity of 3.

In a preferred embodiment, as further shown in FIG. 1A, element antenna arrays 110-125 may be in the form of truncated rectangular patches that operate in a different mode than an ordinary rectangular patch. The distributed currents on the patch follow a circular path caused by the trimmed corners of the patch. The preferred embodiment of the present invention employs a 3.3 mm by 3.4 mm patch with corner truncation length of 1.4 mm at patch corners that will provide right-hand circular polarization. This forms a hexagon having two opposing parallel sides that are longer in length than the remaining four sides.

In other aspects, the present invention provides one or more truncated rectangular patches that create an elliptical polarized dual-band element, with center frequencies far apart from each other. In one embodiment, the center frequencies are 23 GHz and 29.8 GHz. The advantage of this embodiment is the acquisition of a radiating element with circular polarization and wideband operation tendency that can be later on exploited while forming a 16-element antenna array. In other words, it is close to impossible to design a printed single element that can operate in large bandwidths with circular polarization behavior. Thus, this approach uses an elliptical polarized base radiating element having the tendency of these features. In addition, improved performance, such as bandwidth and circular polarization traits, is achieved by combining the single element with a sequential rotational series feeding network.

The sequential rotational series feeding network provides wideband power distribution to the output ports. An advantage of using such a divider is that the series configuration can provide 90° phase difference between its output ports at the desired frequency. The other advantage is the rotational formation that permits size reduction and an orthogonal configuration between the connecting elements.

Figure 3:
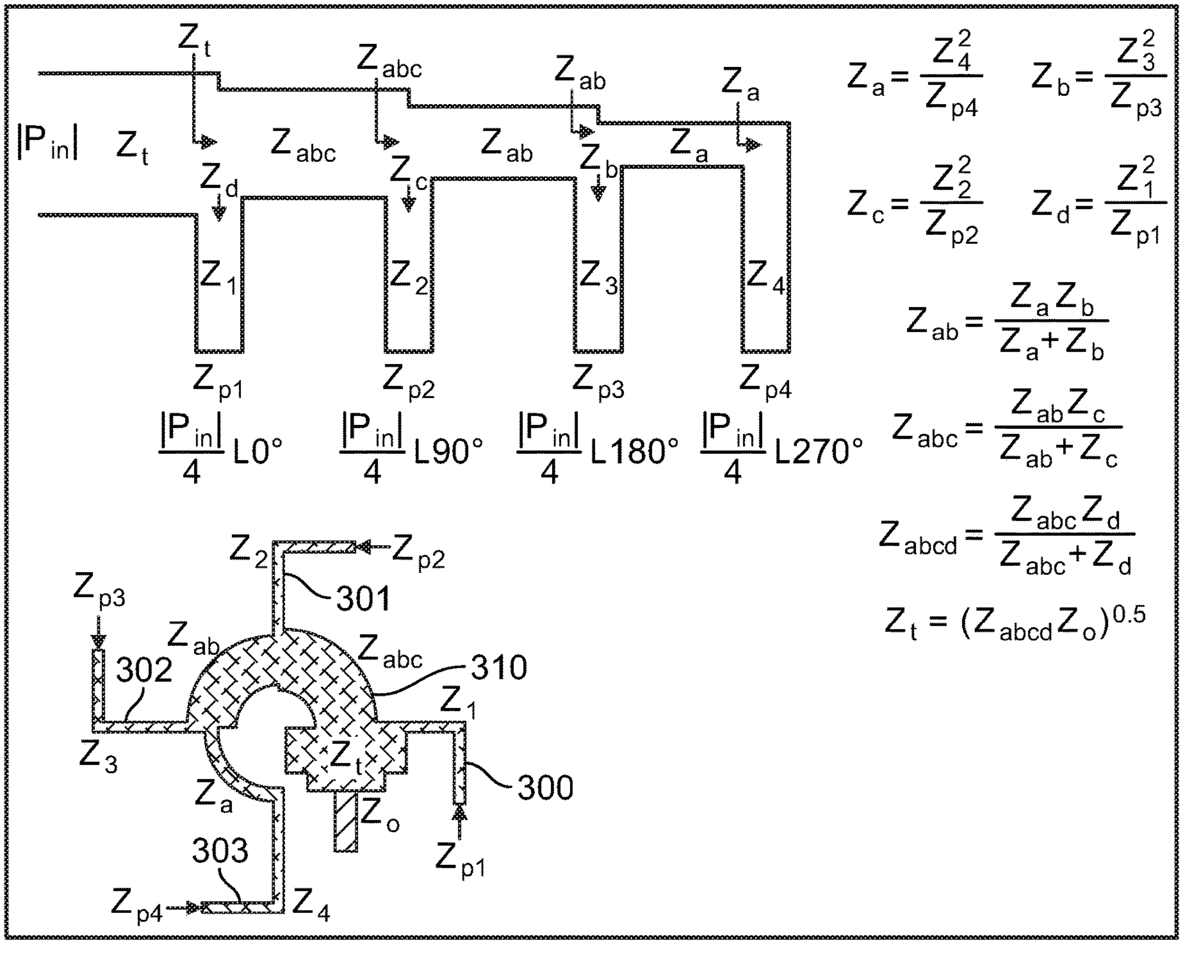
FIG. 3 shows a microwave transmission line analysis of a power diverter for an embodiment of the present invention.

In another aspect, microwave transmission line analysis along with circuit analysis may be performed to determine the different impedances of the different transmission lines of the divider for matching techniques, equal power distribution and size reduction, as FIG. 3 shows.

The input impedance of the power divider is desired to be 50 Ohm while the output ports are to be around 135 Ohm, the impedance seen from the truncated patches. As shown in FIG. 3, transmission lines 300-303 of the divider are 90° corner arcs connected to curved base 310. The length of the transmission lines feeding the patches is determined by the patch separations.

Figure 4:
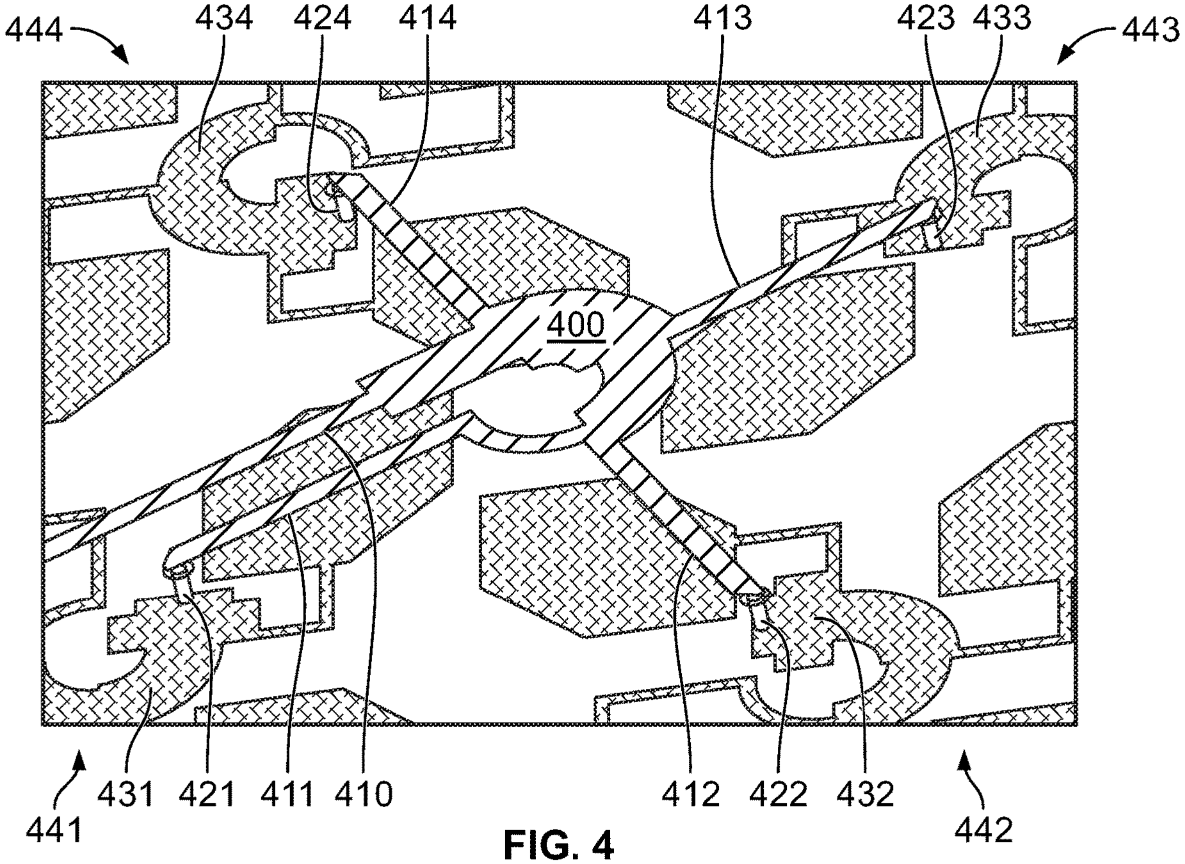
FIG. 4 illustrates a bottom-feeding network that connects to a plurality of group arrays using VIAs for an embodiment of the present invention.

The main feed network of the array is implemented at the bottom layer and the connection to the group array is done through VIAs, as FIG. 4 depicts. In a preferred embodiment of the present invention, series power divider 400 includes VIA 421 which supplies serial power divider 431 of array 441. This configuration is repeated for the other arrays of the antenna. For example, VIA 422 supplies serial power divider 432 of array 442; VIA 423 supplies serial power divider 433 of array 443; and VIA 424 supplies serial power divider 434 of array 444. This embodiment of the present invention automatically unlocks new array configurations, much more efficiently than what is currently known for sequential rotation series feeding type power dividers. Thus, the present embodiment forms a square symmetrical 4-element array. The over-truncated patch elements are consecutively orthogonal to each other but also in the smallest distance possible of 0.9 λg at fc=26 GHz. The significant smaller distance is achieved because no transmission line barriers exist at the top layer, as feeding channels. Reducing the distance between the elements improves significantly the gain and reduces the side lobe level of the antenna radiation pattern.

Furthermore, once the 4 elements are connected to the power divider, the divider's sections are tuned to create a wideband radiator (the group array), with an extra improvement of the circular polarization purity.

The 4-group array of the preferred embodiment of the present invention may be implemented at the top layer of the stack antenna incorporating 16 elements. These groups are fed through VIAs from the bottom of the stack. Each VIA has 0.1 mm radius and passes through 0.2 mm radius ground holes. The ground plane is sandwiched between the top and bottom substrates. The bottom substrate is an RT5870 with 0.13 mm thick slab with a relative permittivity of 2.33 and hosts the main feeding network.

Figure 5:
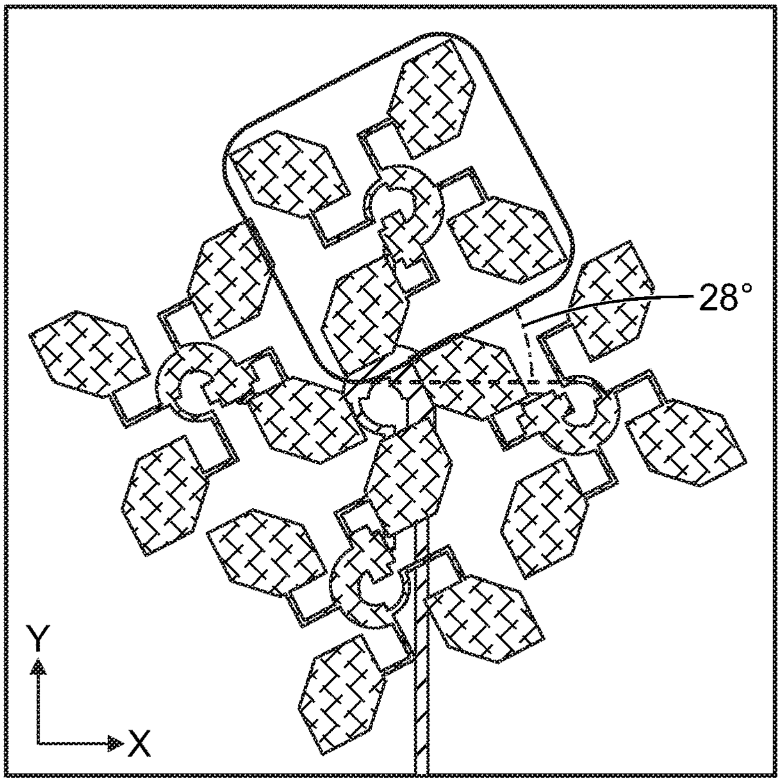
FIG. 5 illustrates the inclination of group arrays for an embodiment of the present invention.

As shown in FIG. 4, the main feeding network is also a sequential rotational series power divider 400 designed using microwave transmission line and circuit analysis. The main divider may be configured to distribute power from a 50 Ohm input port 410 to 50 Ohm output ports 411-414. The 50 Ohm output ports are connected to VIAs 421-424 which in turn, extend to the input port of each group array 441-444. Hence, the 16-element array configuration is also arranged by different formations of the main feeding network output arms, at the bottom of the stack antenna. Moreover, the arms are consecutively orthogonal to each other. Therefore, the group arrays at the top are also orthogonally aligned with each other. As shown in FIG. 5, in another aspect of the present invention, the rotation of the different group arrays is at 28° with respect to the x-axis. This allows an additional size reduction of the entire array by decreasing the separation between the different array groups to 1.5 λg. An additional benefit of the rotation is that the radiating elements now interfere constructively hence improving the gain and reducing the side lobe levels.

Figure 6:
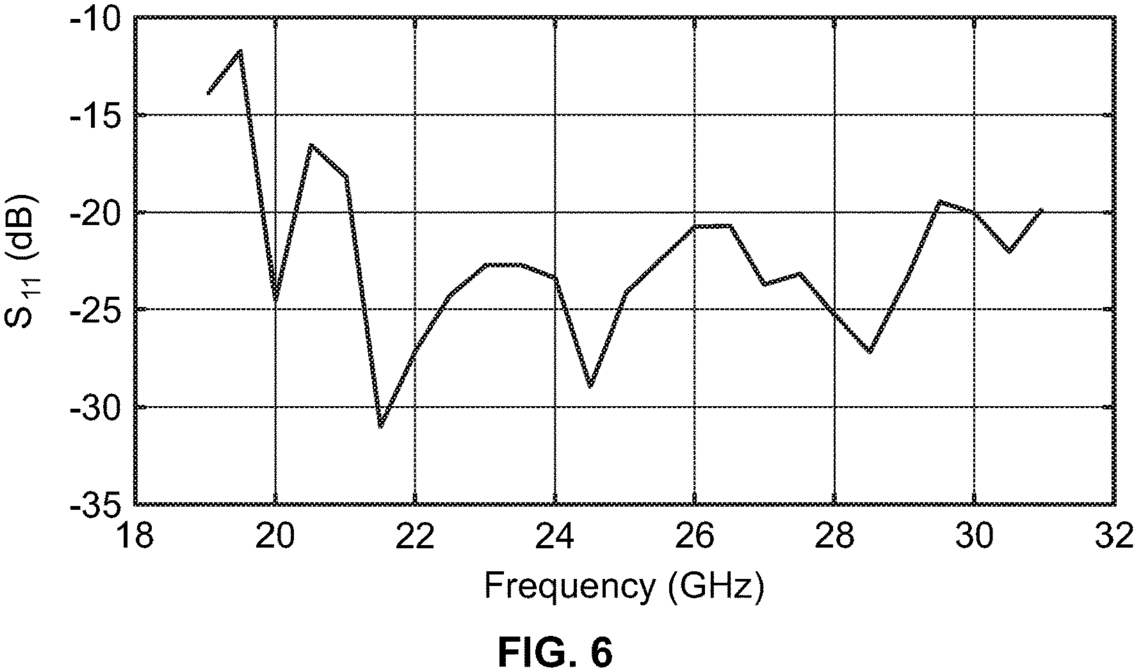
FIG. 6 illustrates an input reflection coefficient of an antenna array of the present invention.

The preferred embodiment of the present invention provides a 16-element circularly polarized antenna array that is a compact miniaturized stack antenna with exceptional characteristics. The embodiment has a reflection coefficient less than −20 dB at the frequency range of interest (21-31 GHz). The antenna operating range extends more than the above-mentioned range, as FIG. 6 shows.

Figure 7:
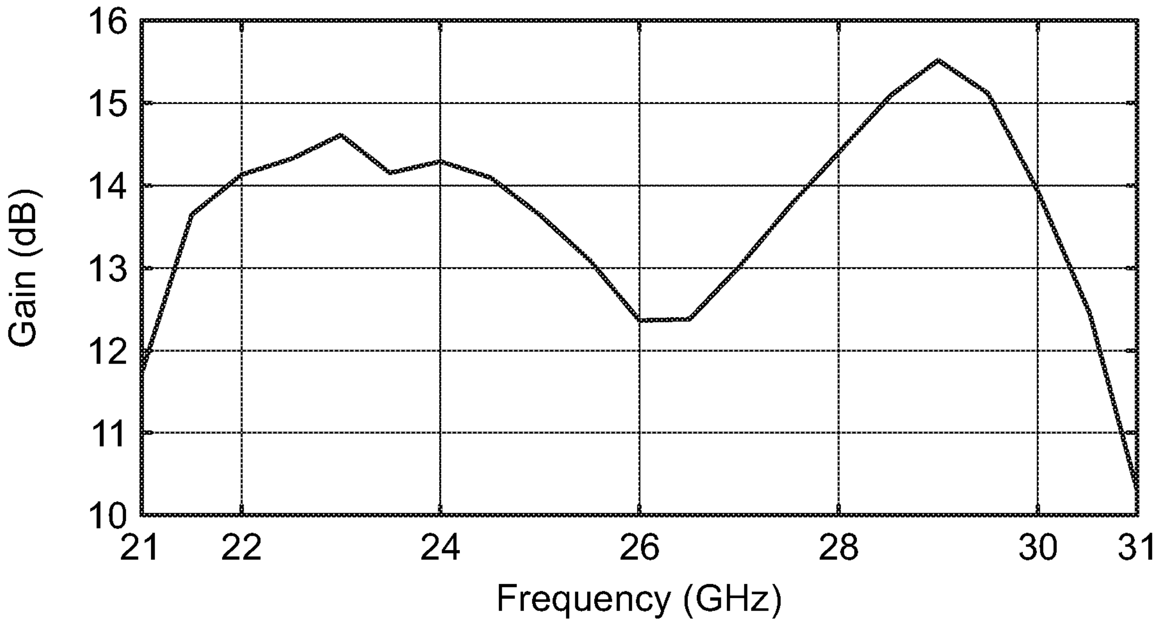
FIG. 7 illustrates the gain of an antenna for an embodiment of the present invention.

The gain produced by the array is 12-15 dB at frequencies between 21-30.8 GHz. The gain peaks are situated at the resonant frequencies of the dual-band over-truncated elliptically polarized single element, as shown in FIG. 7.

Figure 8:
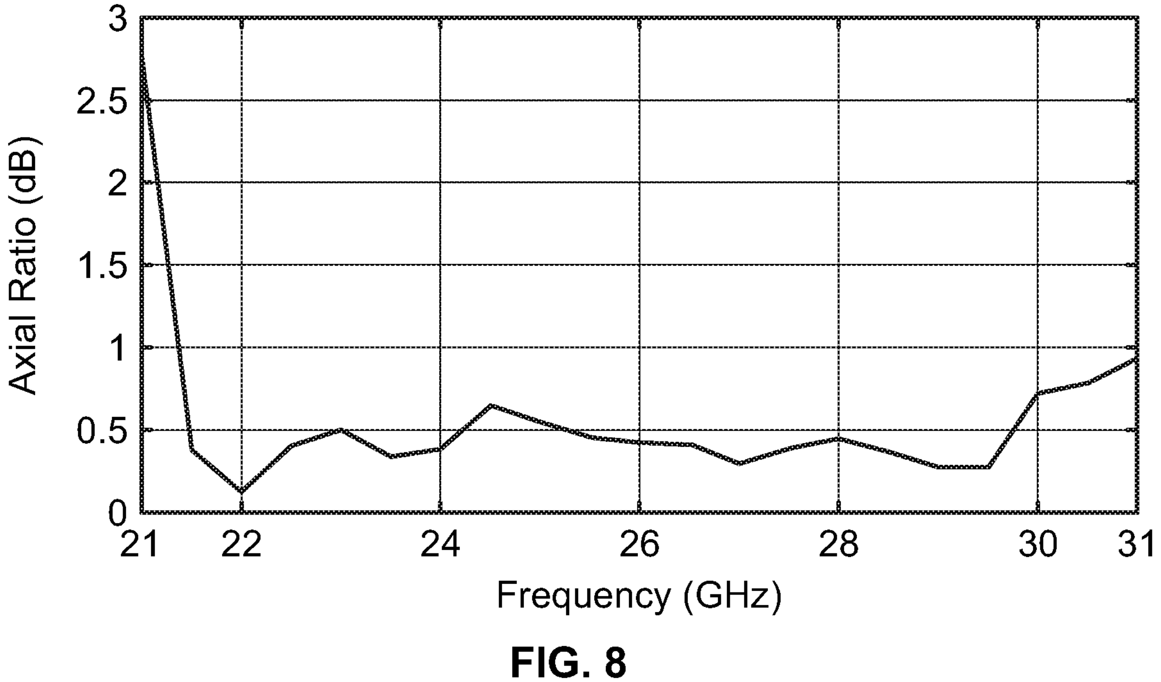
FIG. 8 illustrates an axial ratio of an antenna for an embodiment of the present invention.

The axial ratio of the antenna array is less than 0.5 dB at frequencies between 21.5-30 GHz, while above 0.5 dB is extended beyond 31 GHz, as shown in FIG. 8.

Figure 9:
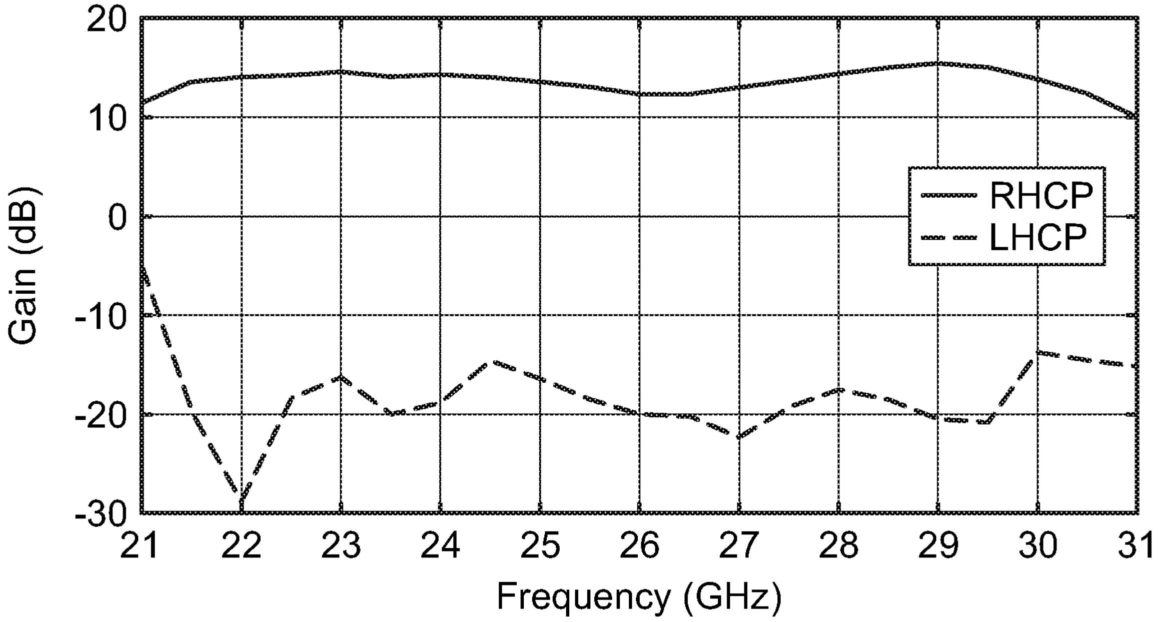
FIG. 9 illustrates RHCP and LHCP gain discrimination for an antenna for an embodiment of the present invention.

The cross-polarization discrimination between RHCP and LHCP that is produced by the current model is at least 25 dB, as shown in FIG. 9.

Figure 10:
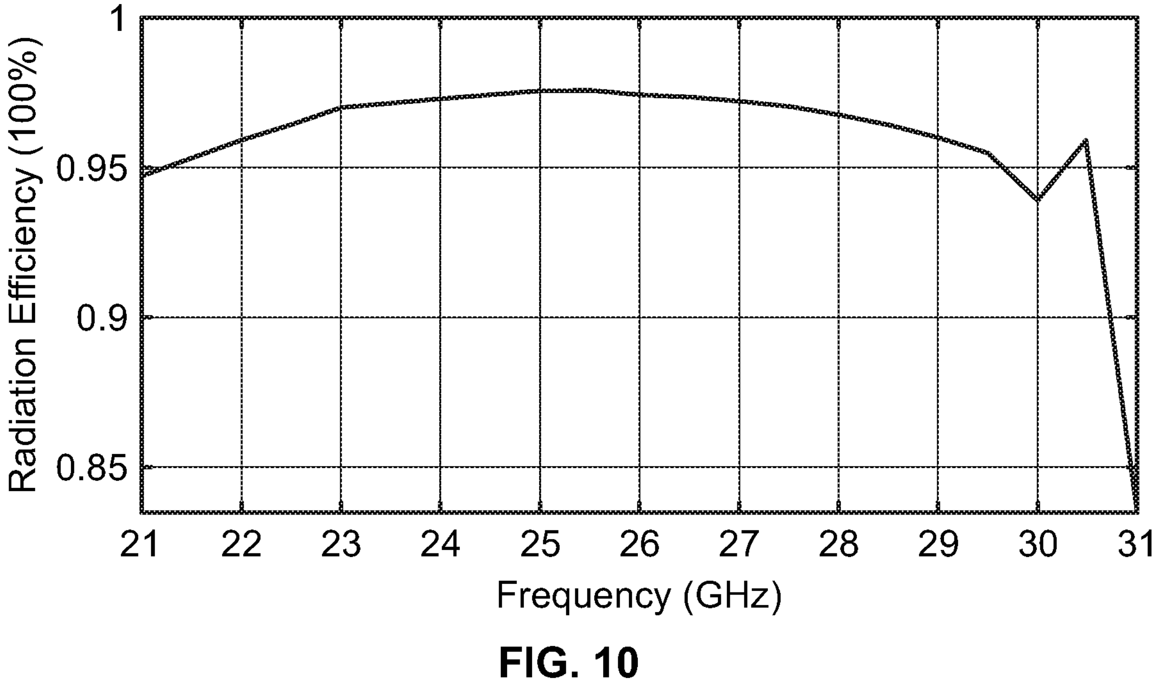
FIG. 10 illustrates the radiation efficiency of an antenna for an embodiment of the present invention.

The radiation efficiency of the antenna is more than 95% at the frequency range 21-30.5 GHz, as shown FIG. 10.

Figure 11:
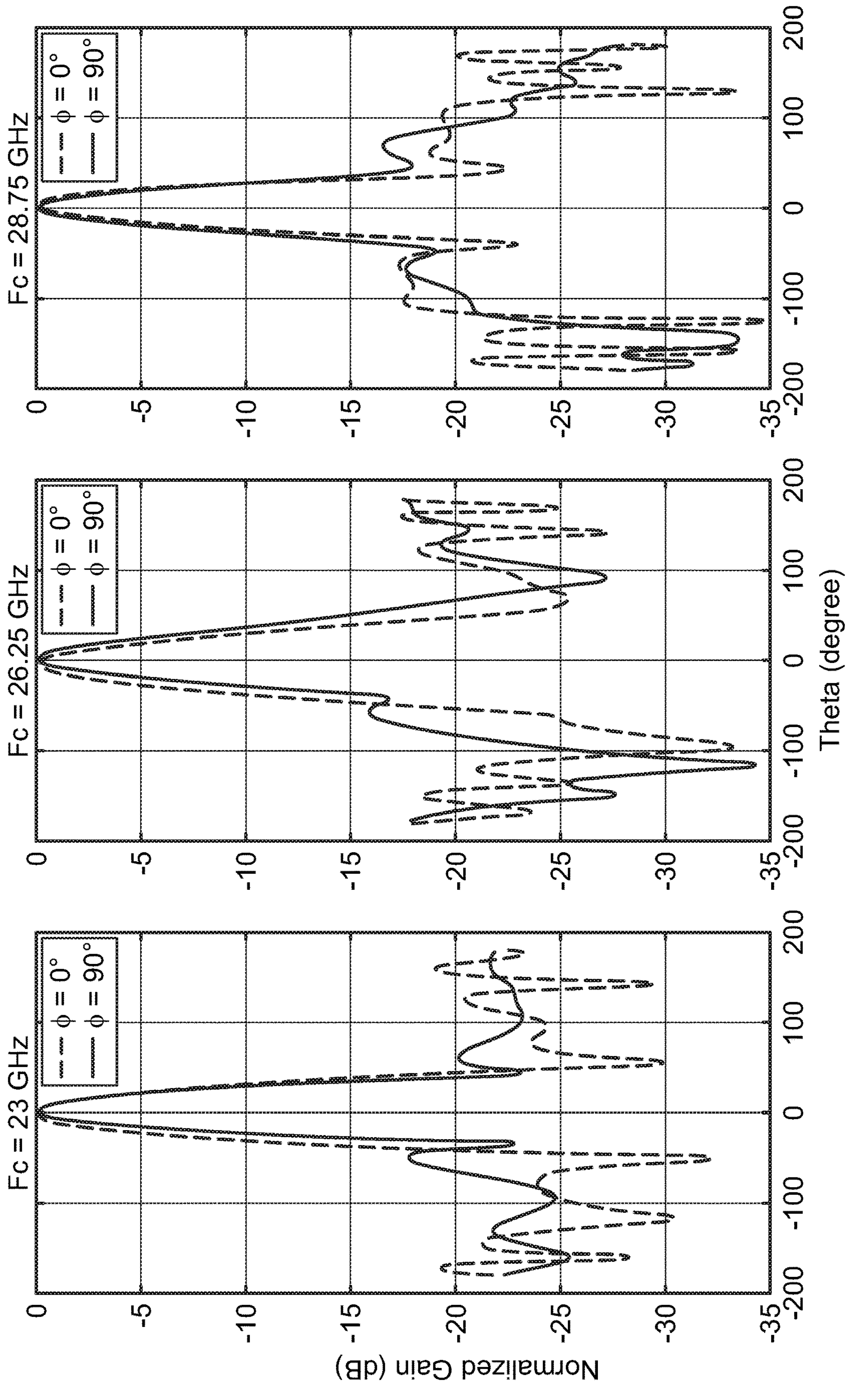
FIG. 11 illustrates a radiation pattern and side lobe levels of an antenna for an embodiment of the present invention.

The radiation pattern of the array at 23 GHz shows a side lobe level (SLLs) lower than 20 dB in the plane Φ=0° and a SLL lower than 17.5 dB in the plane Φ=90°. The radiation pattern of the array at 26.25 GHz shows a side lobe level lower than 20 dB in the plane Φ=0° and a SLL lower than 15 dB in the plane Φ=90°. The radiation pattern of the array at 28.75 GHz shows a side lobe level lower than 17.5 dB in the plane Φ=0° and a SLL lower than 17 dB in the plane Φ=90° as seen in FIG. 11.

The embodiments of present invention insure wideband characteristics such as reflection coefficient, axial ratio, high gain, low side lobes and high efficiency, through a series of methodical steps. The total size of the antenna is 52×32 mm. Thus, the final model is a miniaturized antenna for CubeSat operations.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A circularly polarized antenna comprising:

a plurality of arrays;

said arrays comprised of a plurality of antenna elements;

said antenna elements are consecutively orthogonal to each other;

said antenna elements are configured as truncated rectangular patches; and said antenna elements create an elliptical polarized dual with separate center frequencies.

2. A circularly polarized antenna comprising:

a plurality of arrays;

said arrays comprised of a plurality of antenna elements;

said antenna elements are consecutively orthogonal to each other; and said antenna elements are in the shape of hexagons having two opposing parallel sides that are longer in length than the remaining four sides.

3. The antenna of claim 2 further including a power divider for each array.

4. The antenna of claim 3 wherein each of said power dividers include a curved base and a plurality of 90° corner arcs.

5. The antenna of claim 3 wherein each of said power dividers has an output port and said power dividers are in a series configuration that provides a 90° phase difference between said output ports.

6. The antenna of claim 3 wherein said antenna elements are arranged as four arrays that form a square pattern.

7. The antenna of claim 3 wherein said antenna elements are stacked above said power dividers.

8. The antenna of claim 4 wherein said 90° corner arcs are consecutively orthogonal to each other.

9. The antenna of claim 7 wherein said arrays are orthogonally aligned with each other and the rotation of said arrays is at 28° with respect to an x-axis.

10. The antenna of claim 9 wherein said truncated rectangular patches create an elliptical polarized dual-band element, with at least two different center frequencies.

11. The antenna of claim 9 wherein said over-truncated patch elements are consecutively orthogonal to each other.

12. The antenna of claim 10 wherein said over-truncated patch elements are connected to a power divider and said power divider includes sections tuned to create a wideband radiator (the group array).

13. A wideband right hand circularly polarized antenna comprising: a 16-element array that consists of 4 groups of 4-element antenna arrays, each group consists of a sequential rotation series power divider feeding four over-truncated rectangular patches.

14. The antenna of claim 13 further including a power divider for each array.

15. The antenna of claim 14 wherein each of said power dividers include a curved base and a plurality of 90° corner arcs.

16. The antenna of claim 14 wherein each of said power dividers has an output port and said power dividers are in a series configuration that provides a 90° phase difference between said output ports.

17. The antenna of claim 14 wherein said antenna elements are arranged as four arrays that form a square pattern.

18. The antenna of claim 14 wherein said antenna elements are stacked above said power dividers.

19. The antenna of claim 14 wherein said arrays are orthogonally aligned with each other and the rotation of said arrays is at 28° with respect to an x-axis.

20. The antenna of claim 15 wherein said 90° corner arcs are consecutively orthogonal to each other.

* * * * *